(No Model.) 2 Sheets—Sheet 1.
C. D. BAIRD.
CORN PLANTING ATTACHMENT FOR PLOWS.
No. 546,753. Patented Sept. 24, 1895.
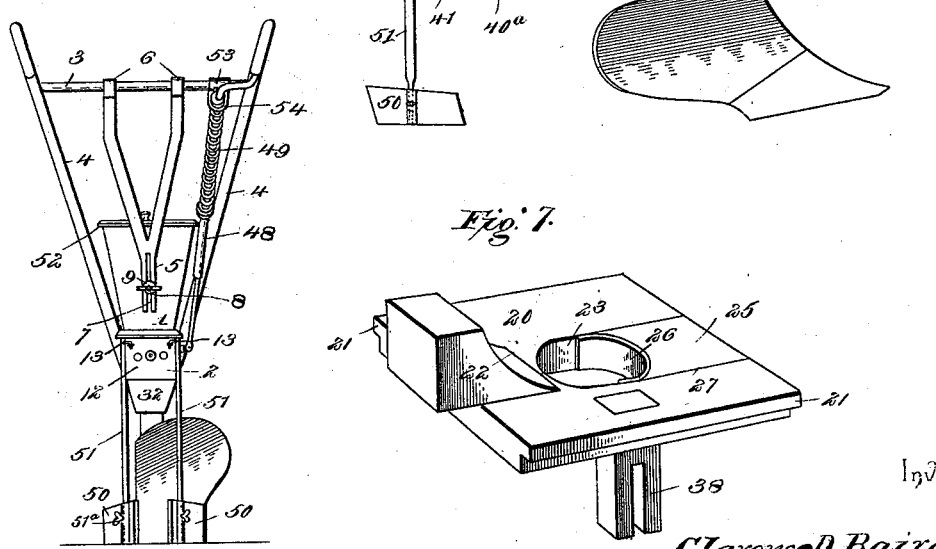
Witnesses
John C. Shaw
N. T. Riley
Inventor
Clarence D. Baird
By his Attorneys.
C. A. Snow & Co.
ANDREW B. GRAHAM, PHOTO-LITHO, WASHINGTON, D.C.

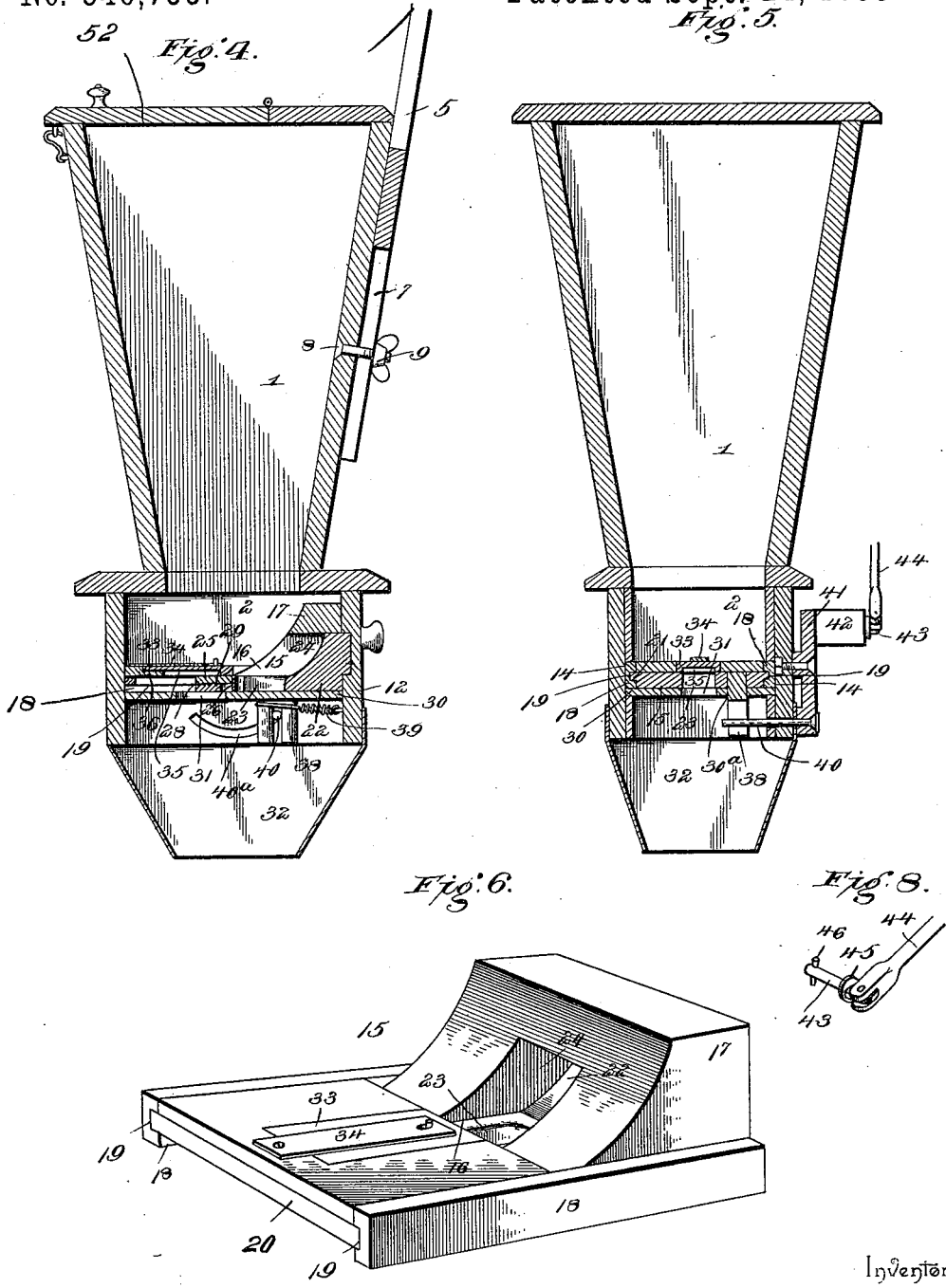

UNITED STATES PATENT OFFICE.

CLARENCE D. BAIRD, OF ALEXANDRIA, TENNESSEE, ASSIGNOR OF TWO-THIRDS TO D. W. DINGES AND J. R. SNEED, OF SAME PLACE.

CORN-PLANTING ATTACHMENT FOR PLOWS.

SPECIFICATION forming part of Letters Patent No. 546,753, dated September 24, 1895.

Application filed October 20, 1894. Serial No. 626,512. (No model.)

*To all whom it may concern:*

Be it known that I, CLARENCE D. BAIRD, a citizen of the United States, residing at Alexandria, in the county of De Kalb and State of Tennessee, have invented a new and useful Corn-Planting Attachment for Plows, of which the following is a specification.

The invention relates to improvements in corn-planting attachments for plows.

The object of the present invention is to enable land to be plowed and seed to be dropped and covered at one operation to facilitate planting and to lessen the number of farm-hands required for the same.

A further object of the invention is to provide a corn-planting attachment which may be readily applied to the ordinary construction of plow and which is capable of adjustment in order that it may be arranged at the desired elevation and in proper relation with the plow and to regulate the dropping of the seed.

The invention consists in the construction and novel combination and arrangement of parts hereinafter fully described, illustrated in the accompanying drawings, and pointed out in the claims hereto appended.

In the drawings, Figure 1 is a plan view of a plow provided with a corn-planting attachment constructed in accordance with this invention. Fig. 2 is a side elevation of the same. Fig. 3 is a rear elevation. Fig. 4 is a vertical longitudinal sectional view of the hopper, illustrating the construction of the dropping mechanism. Fig. 5 is a transverse sectional view of the same. Fig. 6 is a detail perspective view of the removable bottom of the hopper. Fig. 7 is a similar view of the seed-slide. Fig. 8 is a detail view of the front end of the operating-rod. Fig. 9 is a detail sectional view of the hopper.

Like numerals of reference indicate like parts in all the figures of the drawings.

1 designates a seed-hopper, provided at its lower end with a casing 2, containing the dropping mechanism; and it is adjustably suspended from a cross-bar or rung 3 of plow-handles 4 by an approximately Y-shaped suspension-bar or support 5, having a forked upper portion provided with hooks 6, engaging over the said cross-bar or rung 3. The lower portion or stem of the Y-shaped bar or support is provided with a longitudinal slot 7, open at the lower end and receiving a screw 8, which extends from the rear side of the seed-hopper and which is provided with a thumb-nut 9, whereby the Y-shaped suspension-bar or support is adjustably secured to the hopper; but any other form of clamping-screw may be employed for adjustably connecting the seed-hopper with the support or suspension-bar. The front of the hopper is secured to the rear end of a plow-beam 10 by a pair of connecting-bars or metal straps 11, embracing the rear end of the plow-beam and the casing 2 and secured to those parts. By means of the connecting-bars or straps 11 and the Y-shaped support or suspension-bar the corn-planting attachment may be readily applied to the ordinary construction of plow and is capable of adjustment to arrange it in the desired position with relation to the plow and the ground.

The seed-hopper is tapering, and its casing 2 is provided with a removable back 12, detachably secured to the sides by hooks and eyes 13, or any other suitable fastening device may be employed. The inner faces of the sides of the casing are provided with opposite horizontally-arranged grooves forming ways 14, and arranged therein is a removable hopper-bottom 15, having an opening 16 and inclining upward in rear of the opening 16, and at opposite sides thereof, as at 17, for the purpose of directing seed into the said opening 16. The removable bottom is provided with depending flanges 18, located at opposite sides of the bottom and fitting in the ways 14 and provided in the inner faces of their depending portions with grooves forming ways 19, receiving a reciprocating seed-slide 20.

The seed-slide 20 is provided at opposite sides with projecting flanges 21 to fit in the ways 19, and it has an upward-extending concavely-beveled boss or projection 22, located in rear of the seed-opening 23, for directing seed into the latter. The projection or boss 22 is arranged in a central longitudinal opening 24 of the upward-extending enlargement 17 of the removable bottom.

The seed-opening 23 is regulated, in order to drop few or many grains of corn, by means of an adjustable plate 25, provided at its rear end, which is concavely recessed, with a depending flange 26, forming the front wall of the seed-opening. The adjustable plate is located in a recess 27 of the seed-slide and is provided on its lower face with a depending transversely-disposed rib 28, triangular in cross-section or oppositely beveled and engaging shouldered grooves or corrugations 29 at the bottom of the recess 27.

The seed-slide is located above a stationary supporting-frame 30, which has a slot 30ª, and is provided with a discharge-opening 31, located in advance of the opening 16 of the removable bottom 15, whereby, when the seed-slide is reciprocated, seed will be conveyed from the hopper and discharged through the opening 31 and will fall to the ground. The hopper is provided with a depending tapering portion or spout 32, extending downward from the casing.

In order to prevent the seed clogging the seed-slide, the removable bottom 15 is provided in advance of the opening 16 with an upwardly-yielding cut-off plate 33, located in a recess of the removable bottom 15 and having its upper face flush with the upper face of the bottom 15. The upwardly-yielding plate 33 is attached to a spring 34, disposed longitudinally of the plate 33 and secured to the bottom 15 in advance of the recess for the plate. The rear end of the yielding plate 33 is beveled, and its lower face 35 is recessed to afford an escape for the corn. This construction effectively prevents corn from becoming wedged between the seed-slide and the removable plate or bottom 15 and clogging the former. The removable bottom is provided at the front portion of the plate 33 with a reduced portion 36, extending rearward, for supporting the same.

Depending from the seed-slide is a slotted lug 38, connected with the removable back 12 by a spiral spring 39 and receiving in its slot an arm or pin 40 of a bell-crank lever 41. The bell-crank lever 41 is fulcrumed on the hopper, at one side of the casing, adjacent to a curved slot 40ª and is operated, by means hereinafter described, to actuate the slide and move the same forward, and the seed-slide, after being moved forward, is assisted in its return by the spiral spring 39.

The bell-crank lever 41 has an upper lateral offset arm 42, which is connected by a transverse pin 43 with an operating-rod 44, extending rearward to the plow-handles within easy reach of the operator, who stands, as is usual, at the rear of the plow. The lower end of the operating-lever is bifurcated or slotted, and the outer end of the pin is pivoted therein. The inner portion of the pin 43 is rounded and is provided with a flange or collar 45, and it is secured in a perforation of the laterally-offset arm 42 by a fastening device 46, such as a pin, nut, or the like.

The operating-rod 44 is adjustable and is composed of two telescoping sections connected by a set-screw 47, the upper section 48 being tubular and receiving the lower secsection, which is solid. A suitable guide 53 is mounted on the cross-bar or rung 3, or at any other desirable point, for the reception of the operating-rod, and a spiral spring 49 is disposed on the upper portion of the operating-rod for assisting the return of the seed-slide and rendering the operation easy for the attendant. The spiral spring has its lower end bearing against a stop or shoulder of the operating-rod, and its other end engages the upper guide 53 of the plow; and the upper end of the operating-rod is curved to form a grip, which is arranged adjacent to one of the plow-handles in order that the operator may actuate the seed-slide without removing his hand from the plow-handle.

The corn, after it is dropped, is covered by a pair of converging blades 50, located in rear of the hopper and carried by curved standards 51. The curved standards 51 have their upper portions secured to the hopper, at opposite sides thereof, and the lower ends, which may be of any desired configuration in cross-section, are located in perforations of the blades and are secured at any desired adjustment by set-screws 51ª.

The hopper is provided with a hinged lid or cover 52, which is secured, when closed, by means of a hook and eye or any other suitable fastening device.

The adjustable operating-rod enables the stroke of the seed-slide to be readily regulated, the guide 53 being arranged to be engaged by the tubular section and being located at the rung adjacent to the plow-handles. The guide 53 is engaged by a shoulder 54 of the operating-rod, whereby the stroke or movement of the latter is limited, and it will be readily apparent that the stroke of the operating-rod and the lever 41 may be regulated by lengthening and shortening the former.

It will be seen that the corn-planting attachment is simple and comparatively inexpensive in construction, that it is adapted to be readily applied to the ordinary construction of plow, that it enables the plowing of land and the dropping of seed and the covering of the same to be performed at one and the same time, and that the whole is controlled by the person who operates the plow.

Changes in the form, proportion, and the minor details of construction may be resorted to without departing from the principle or sacrificing any of the advantages of this invention.

What I claim is—

1. The combination with a plow, of a seed hopper provided with dropping mechanism and located in rear of the plow beam, the plates 11 pivoted to the beam and to the hopper and hinging the latter to the former, and the substantially Y-shaped support adjustably secured to the hopper, and provided at the upper terminals of its diverging arms with hooks engaging the cross-bar or rung of the plow handles, and rigidly supporting the hopper at the desired adjustment, substantially as described.

2. The combination of a hopper having an opening in its bottom and provided with an enlargement located at the rear of the opening and having an inclined front face, an upwardly yielding plate located at the front of the opening of the bottom, and having an actuating spring, a reciprocating seed slide having a seed opening and provided in advance of the same with a recess having corrugations, said seed slide being provided in rear of its opening with a beveled projection, and an adjustable plate mounted on the seed slide in advance of the opening thereof for regulating the size of the same and interlocked with said corrugations and located beneath the upwardly yielding plate and held by the same in engagement with the corrugations, substantially as described.

3. The combination of a hopper having an opening in its bottom, an upwardly yielding spring pressed plate mounted on the bottom of the hopper and projecting over the opening thereof, a reciprocating seed slide having a seed opening and provided in advance of the same with corrugations, and an adjustable plate interposed between the corrugated portion of the seed slide and the yielding plate and held by the same in engagement with the corrugations, said adjustable plate being provided with a depending portion or flange arranged in the opening of the seed slide and adapted to vary the size of the same, substantially as described.

4. The combination of a hopper, a casing located at the bottom thereof and having a removable back, a supporting plate disposed horizontally in the casing and provided with a longitudinal slot and having a discharge-opening, a removable bottom arranged within the casing and provided at opposite sides with depending flanges forming ways and having an opening, a reciprocating seed-slide mounted in said ways and having a seed-opening and provided with a depending lug arranged in the slot of the supporting plate, and means for operating the seed-slide and connected with the lug thereof, substantially as described.

5. The combination of a hopper, a casing located at the bottom of the same and having a removable back and provided at one side with a curved slot, a supporting plate mounted in the casing and having a discharge-opening and provided with a longitudinal slot, a removable body mounted in suitable ways of the casing and provided with an opening and having depending flanges provided with ways, a seed-slide arranged in the ways of the flanges and having a seed-opening and provided with a depending lug located in the slot of the supporting plate, a spring connecting the lug with the back of the casing, a lever fulcrumed on the casing and provided with a pin extending through the curved slot thereof and connected with the lug, and means for operating the lever, substantially as described.

In testimony that I claim the foregoing as my own I have hereto affixed my signature in the presence of two witnesses.

CLARENCE D. BAIRD.

Witnesses:
    JOHN F. ROY,
    ROB ROY.